(12) United States Patent
Moffa et al.

(10) Patent No.: US 6,485,102 B1
(45) Date of Patent: Nov. 26, 2002

(54) CHILD RESTRAINT SEATING METHOD AND SYSTEM

(75) Inventors: Michael Douglas Moffa, Glenview; Erin Renee Reichenberger, Chicago, both of IL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 09/715,486

(22) Filed: Nov. 17, 2000

Related U.S. Application Data
(60) Provisional application No. 60/234,613, filed on Sep. 22, 2000.

(51) Int. Cl.$^7$ ................................................. A47C 1/08
(52) U.S. Cl. ...................... 297/253; 297/250.1; 297/254
(58) Field of Search ............................... 297/250.1, 253, 297/254

(56) References Cited

U.S. PATENT DOCUMENTS

| | | | |
|---|---|---|---|
| 2,664,240 A | * 12/1953 | Kindelberger | 297/254 |
| 5,487,588 A | * 1/1996 | Burleigh et al. | 297/253 |
| 6,030,046 A | 2/2000 | Dorow | |
| 6,082,819 A | 7/2000 | Jackson et al. | |
| 6,092,818 A | * 7/2000 | Muller | 297/250.1 |
| 6,095,604 A | 8/2000 | Stack et al. | |
| 6,209,957 B1 | * 4/2001 | Baloga et al. | 297/250.1 |
| 6,234,572 B1 | * 5/2001 | Shiino et al. | 297/253 |
| 6,276,754 B1 | * 8/2001 | Youssef-Agha et al. | 297/253 |

* cited by examiner

*Primary Examiner*—Anthony D. Barfield

(57) ABSTRACT

The instant invention relates to a method and system of securing a child seat in a vehicle that includes a child seat and a child restraint seat and where the child seat has rearwardly projecting anchorage means and a tether hook, and the child restraint seat is an integral and permanent part of a previously existing seat frame or it is installed as OEM in the vehicle and two front projecting loops are provided that engage with the two rearwardly projecting anchorage means of the child seat and a rearwardly projecting loop that engages the tether hook of the child seat and the said three loops are physically attached to a tubular frame of the child restraint seat and are a permanent and integral part thereof to anchor said child seat.

13 Claims, 12 Drawing Sheets

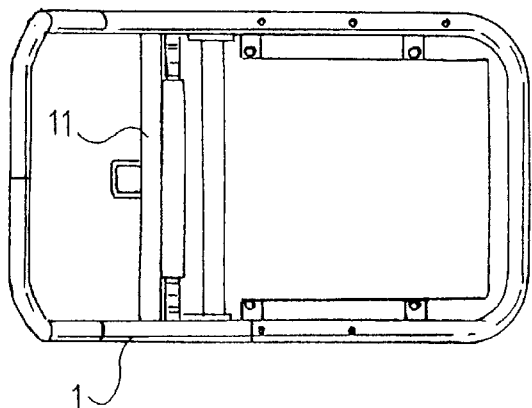
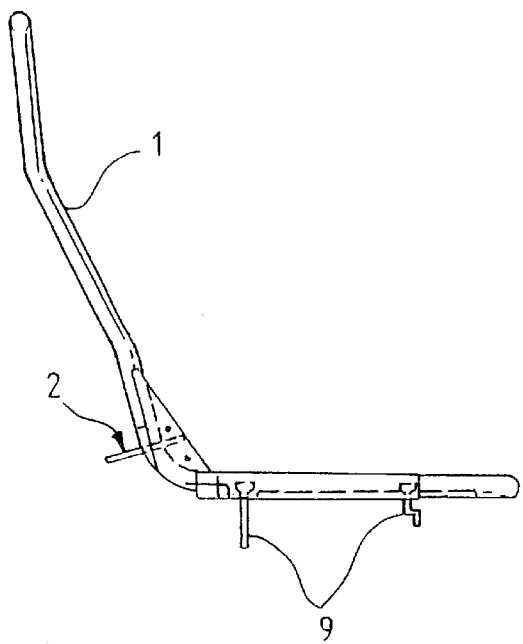
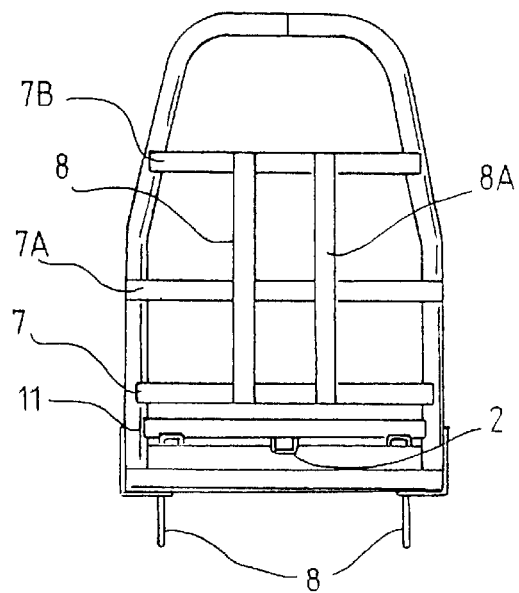

FIG. 3A
FIG. 3B
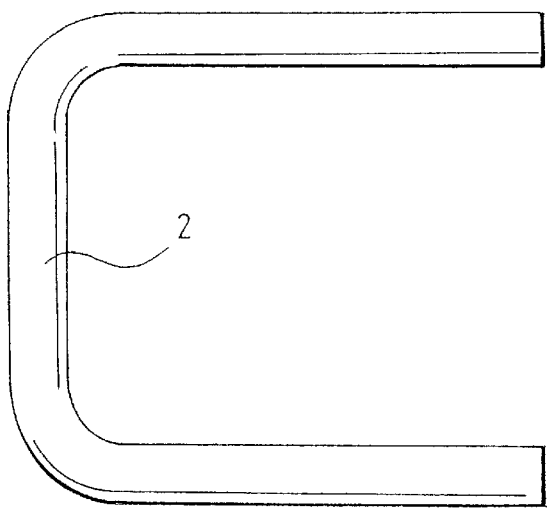
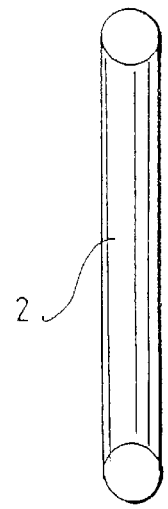

CHILD RESTRAINT SEATING METHOD AND SYSTEM

CLAIM OF PRIORITY

Priority is hereby claimed in U.S. Provisional Patent No. 60/234,613 filed in the United States Patent and Trademark Office on Sep. 22, 2000.

BACKGROUND OF THE INVENTION

Child safety seats have become more and more popular and thus have also become more and more inventive and effective in manners of securing the child safety seat to a vehicle seat. Most commonly a child safety seat rests on a vehicle seat and is secured thereon by the corresponding vehicle seat belt. This method is effective in preventing a child seat from flying off the vehicle seat when rapid deceleration of the respective automobile occurs, as in an accident. However, even when the vehicle's seat belt is pulled tight, there is still undesirable slipping and movement of the child seat on the vehicle seat which may allow for the tippage of the child seat or additional snapping forward of the child seat and thus excessive torque and force upon the infant.

There have been many recent improvements on the common method of securing the child seat to the vehicle seat rather then merely use of the vehicle's seat belt. Darrow in U.S. Pat. No. 6,030,046 disclosed an apparatus for anchoring a child seat within a motor vehicle through the use of an anchorage bar. Stack, et al. in U.S. Pat. No. 6,095,604 disclosed a child seat with a tether hook on a strap, and a vehicle seat with a connector receptacle on the rear portion of the seat, whereby the tether hook is associated with the connector receptacle. Also, Jackson et al. in U.S. Pat. No. 6,082,819 disclosed a child seat with a removable base frame, whereby said base frame is directly and removably attachable to a vehicle seat frame.

The instant invention also relates to a method for securely attaching a child seat to a child restraint seat to insure the proper location for the child restraint system and to insure the strength of the system in order to reduce the likelihood of the anchorage systems' failure. The instant invention relates to the effective securing of child seats to child restraint seats to increase the likelihood that restraints of child seats are properly secured and thus more fully achieve their potential of effectiveness in motor vehicles as set out in the standards in National Highway Traffic Safety Administration Section 571,225, Standard No. 225, Child Restraint Anchorage Systems.

DESCRIPTION OF THE INVENTIONS

The instant invention relates to a method of securing a child in a vehicle by means of a child seat system, wherein said system includes a child seat and a child restraint seat and where the child seat has rearwardly projecting anchorage means, and the child restraint seat is an integral and permanent part of a previously existing seat frame or it is installed as OEM in the vehicle.

The invention applies to child restraint anchorage systems for passenger cars, trucks, multipurpose passenger vehicles with a gross vehicle weight of 8,500 pounds or less and to buses including school buses, with a gross vehicle weight of 10,000 pounds or less. This invention, accordingly, applies best to passenger vehicles equipped with free-standing passenger seats, to passenger vehicles equipped with three or more forward facing rear designated seating positions, and to passenger vehicles for which the anchorage system is accessible without removing a seating component of the vehicle.

The present invention comprises a system for securing a child seat to a child restraint seat. Said system includes a child restraint seat that is fixedly associated with and supported by a vehicle frame member, where said frame member has rigid engagement means for attachment to a vehicle in order that the frame member and vehicle are an integral part of the seat; and having a cross-member that is rigidly secured thereto with a plurality of metal loops attached to said cross-member wherein two of said loops project forward toward the front of the seat in a horizontal plane parallel to the horizontal portion of said seat and another of the loops projects rearward of said cross-member. The loops are rigidly secured to the cross-member and are readily available for use as anchorage attachment tether points; and the child seat has securing means that are anchored to said forward projecting loops to act as two of the anchorage attachment tether points; and the rearwardly projecting loop is secured to act as a tethering anchor for the child restraint seat by being removably associated with a tether hook that is associated with a strap that is secured to the child seat. In addition, this system is accessible without the need of any tools other than a screwdriver or a coin, and once accessed, it is ready to be sealed without the need for any tools in order to prevent the entry of exhaust fumes into the passenger compartment, and to maintain the current temperature control of the vehicle.

The child restraint seat frame's cross-member may be tubular in shape. Also, a tether anchorage means may include openings that are secured to said forward extending loops by means of pin means once said loops are fitted into said openings. Also, the loops may protrude through upholstery so that they may be associated with tether anchoring means.

Moreover, it can be seen that a method of attaching a child restraint system to a vehicle is described that includes a child restraint seat having a tubular metal frame which supports anchorage attachment means comprising two forward anchorage attachment loops and one rearward anchorage attachment loop; the child restraint seat is then associated with an existing seat frame having at least two metal cross bars by a means of attachment of the child restraint seat frame to the two metal cross bars of the existing seat frame, the means of attachment including, in combination, metal bolts of suitable length to project through the metal cross bars of the existing seat frame and secured by nuts of suitable size.

The aforestated method may also include several variations. First, the two forward anchorage attachment loops and one rearward attachment loop may comprise stainless steel wires welded to a stainless steel cross tube of child restraint seat, where the stainless steel cross tube is welded to the child restraint seat frame. Also, the child restraint seat frame may comprise a tubular U-shaped seat frame with a tubular cross-brace which supports the anchorage attachment means, including the attachment means of two forward anchorage attachment loops and one rearward attachment loop, such loops are metal loops of stainless steel wire welded to a tubular cross brace of child restraint seat frame.

Moreover, the means of attachment of the tubular metal frame of the child restraint seat to the metal cross bars of the existing seat frame may include a frame with four seat mounting brackets welded to the stainless steel tube seat frame and four cap screws or bolts of sufficient length to project through the metal cross bars of the existing seat frame and are held in position by suitably sized spacers and spacer washers and hex nuts tightened into position at required torque. The method also provides accessible tether anchorages for tether hooks ready for use without need of any tools. Further, this method of attaching the child seat permits sealing of the passenger compartment to prevent entrance of exhaust fumes into the passenger compartment.

Further objects and advantages of the invention will become apparent from the following description taken in conjunction with the accompanying drawings.

BRIEF DESCRIPTION OF THE DRAWINGS

FIGS. 1A–1C illustrate the tube seat frame of the child restraint seat in orthographic views.

FIGS. 3A and 3B illustrates the anchorage attachment hooks.

DETAILED DESCRIPTION OF THE DRAWINGS

Figure 4A:
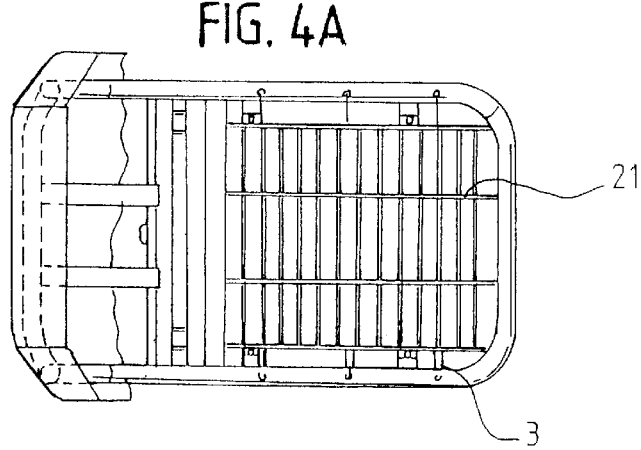
FIGS. 4A–4C illustrate the tubular seat frame of the child restraint seat with constructed seating foam and spring supports in an orthographic view.
Figure 4B:
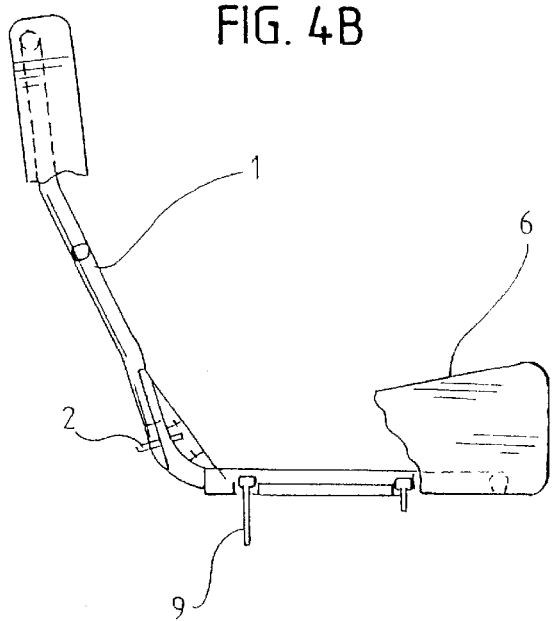
Figure 4C:
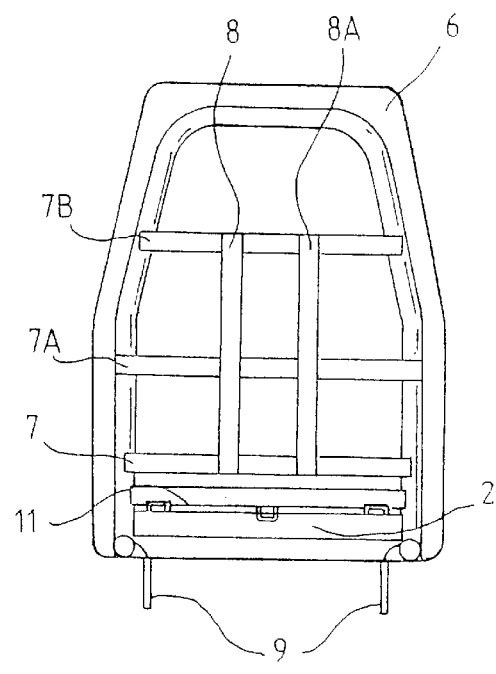
Figure 5A:
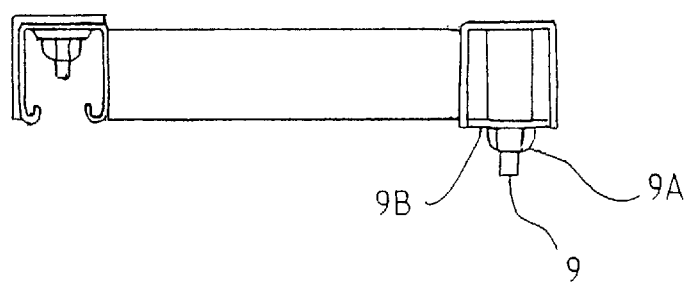
FIGS. 5A–5C illustrate the attachment means of the child restraint seat to the vehicle seat base frame shown in orthographic view.
Figure 5B:
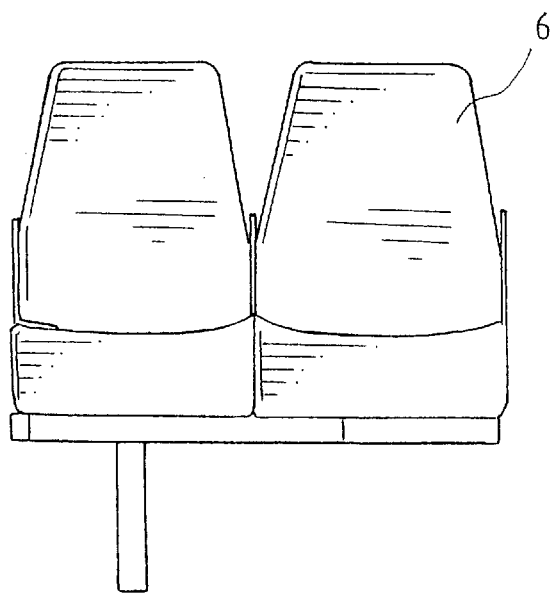
Figure 5C:
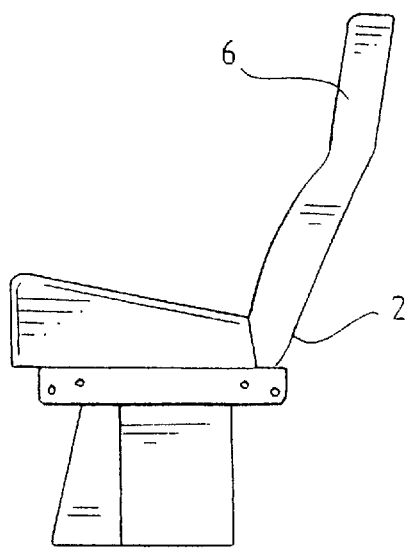
Figure 6:
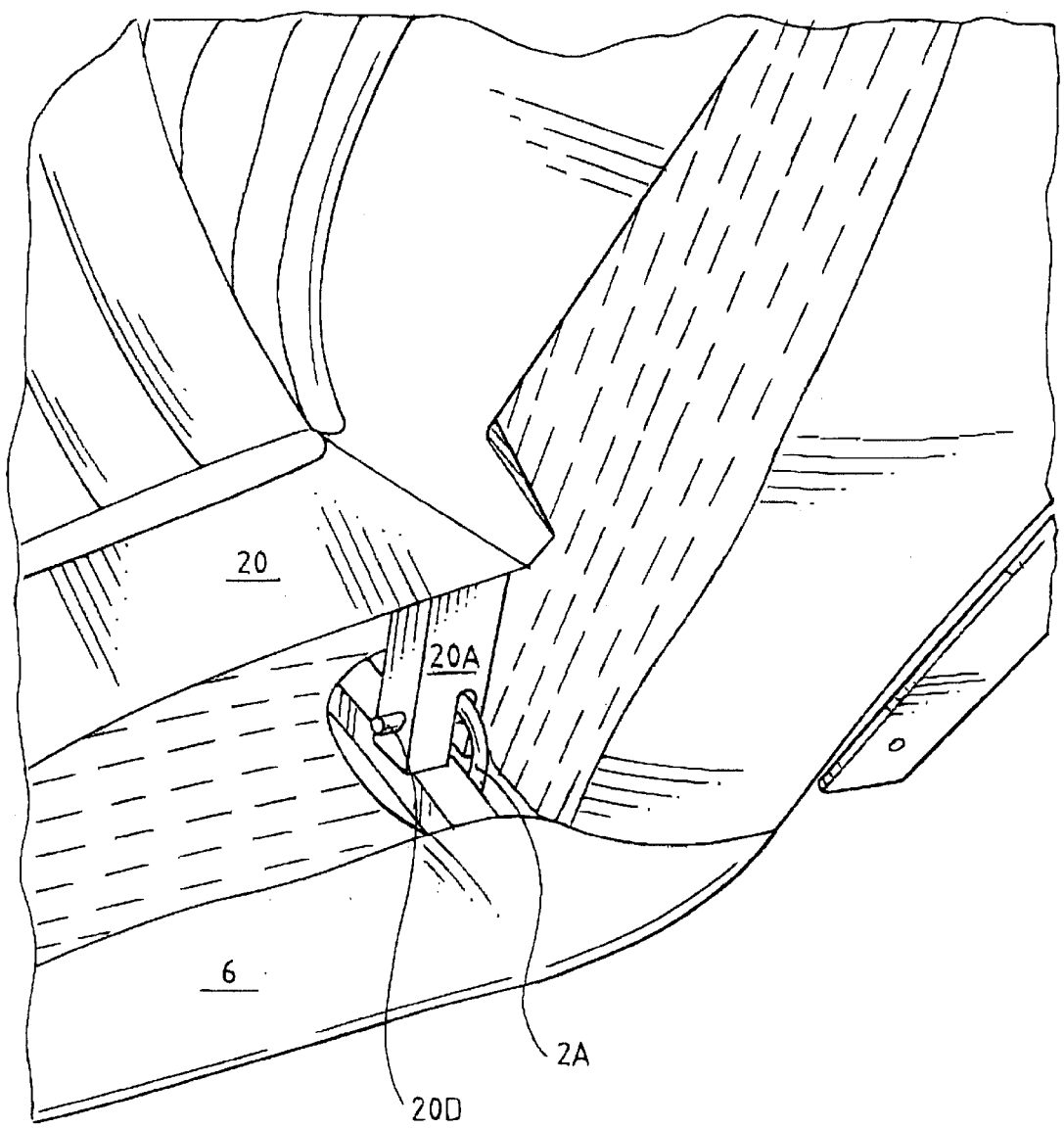
FIG. 6 is an elevational view of the attachment means of the child seat to the child restraint seat.
Figure 10:
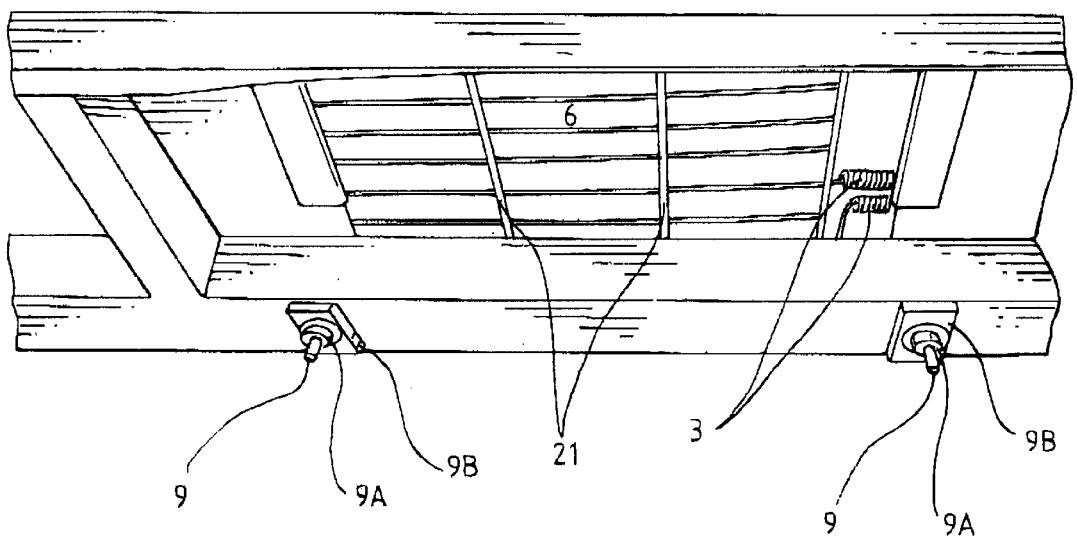
FIG. 10 is a perspective view of the attachment means of the child restraint seat to the vehicle seat base frame.
Figure 11:
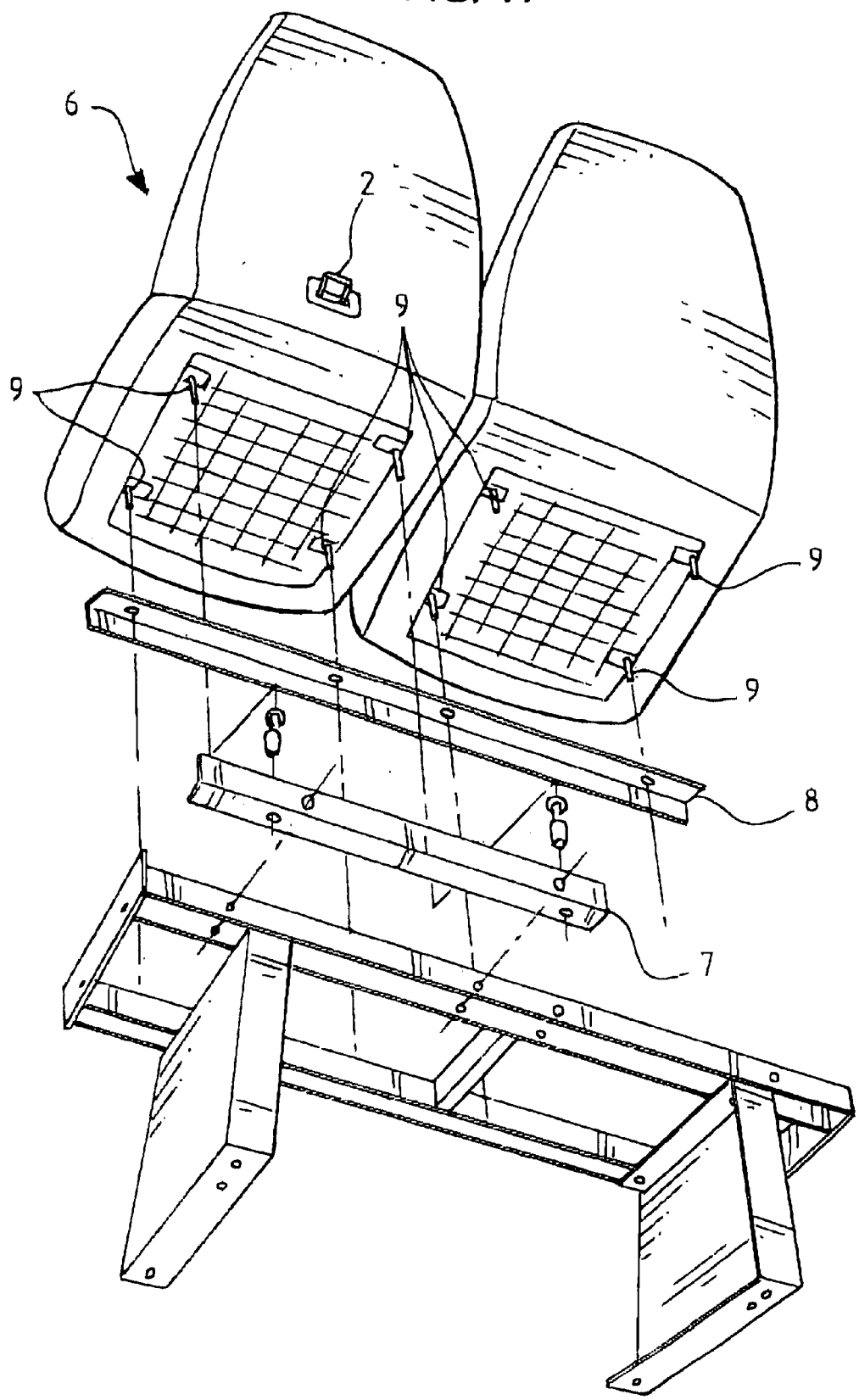
FIG. 11 is and exploded view of the attachment means of the child restraint seat to the vehicle seat base frame.
Figure 12:
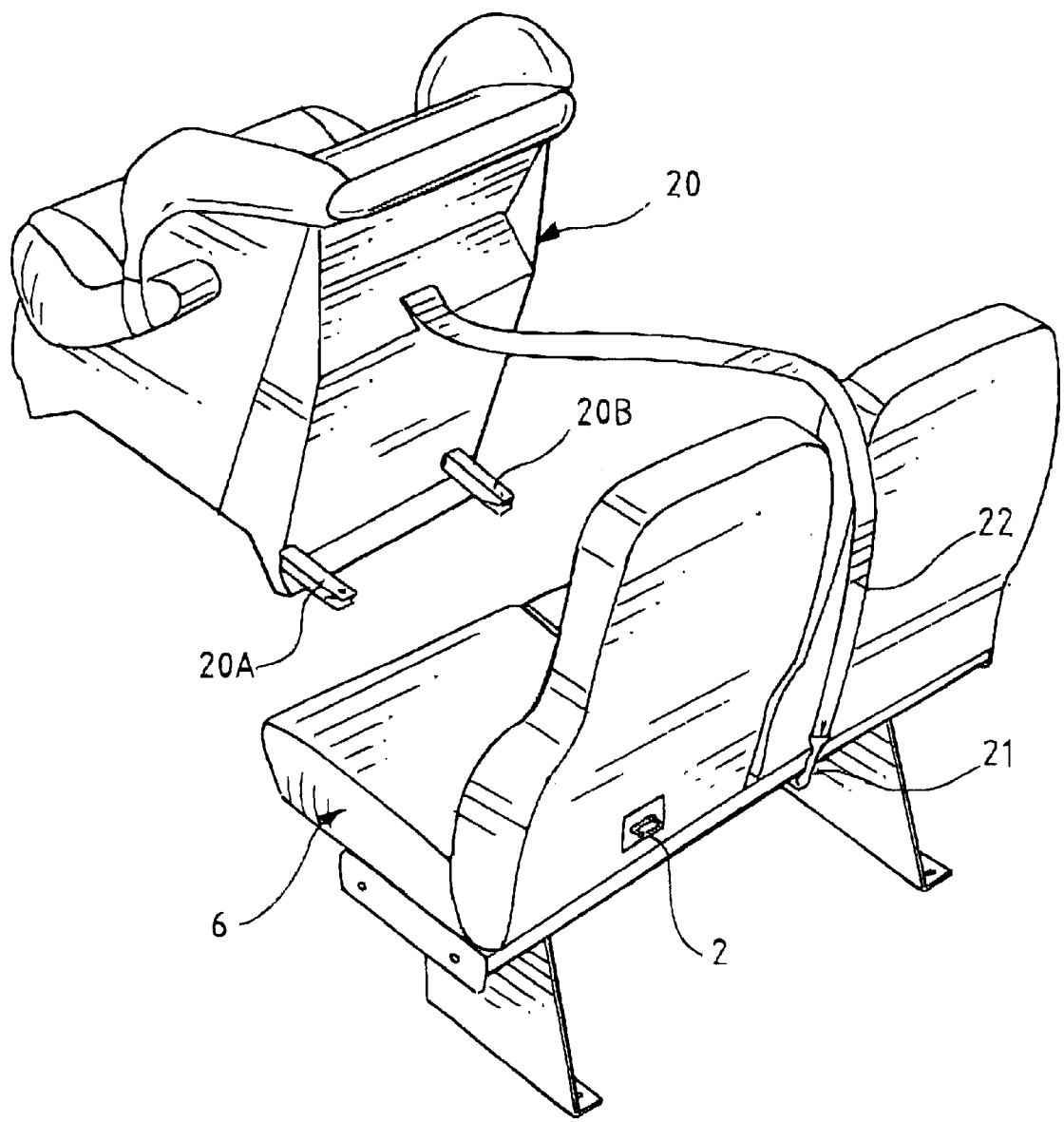
FIG. 12 is a perspective view of the three points of attachment of the child seat to the child restraint seat.

Referring now to the drawings, FIGS. 1–12, and more particularly to FIG. 12, the child restraint seating system accordingly comprises a child seat, 20, with two projecting engagement means, 20A and 20B, from the child seat frame wherein the engagement means, 20A and 20B, engage two front projecting loops, shown in FIG. 6 as 2A and 2B, of the child restraint seat base frame, 1, to form an integral and permanent part of the child restraint seat, 6. Further, the strap, 22, and tether hoot 21, are physically associated with the child seat, 20, and are shown disengaged with the rearward projecting engagement means, 2. The combination of attaching the child seat, 20, to the child restraint seat, 6, via the front projecting loops, 2A and 2B, and simultaneously to the rearward projecting loop, 2, in effect allows for a equal and opposite force upon said child restraint seat frame, 1, and thus results in a static and stable restraint system.

The U-shaped tubular child restraint seat frame, 1, has a back support that leans backward from the vertical plane in a reclining mode as seen in FIG. 1. The parallel U-shaped tubular seat-supports of the frame are fixed in position by a tubular cross brace, 11. Three loops are affixed to the tubular cross brace, 11, and said loops act as engagement means to secure the child seat, 20 to the child restraint seat frame, 1. When the cross brace, 11, is attached to said child restraint seat frame, 1, two loops, 2A and 2B in FIG. 2, project towards the seating area of the seat frame and one loop, 2, projects in the opposite direction. The three U-shaped loops mounted into position on the tubular cross brace, 11, comprise the three anchorage attachment points, 2, 2A, 2B.

The child restraint seating system will withstand a minimum deformation when subjected to a required stated force, as stated in and in compliance with National Highway Traffic Safety Administration Section 571,225, Standard No. 225, Child Restraint Anchorage Systems. The child restraint seating system comprise anchorages, 2, 2A and 2B, which permit the attachment of a tether hook, 21 in FIG. 8, and child seat securing means, 20A and 20B in FIGS. 6–7, and are accessible without need for any tools other than a screwdriver or coin, and are ready for use when system is sealed, due to the method of attachment to the vehicle, thus preventing entry of exhaust fumes into the passenger compartment.

The invented method and system for securely attaching a child restraint seat utilizes a child seat, 20, with two securing means, 20A and 20B, extending rearward by which the child seat, 20, is attached with suitable attachment hardware to the anchorage points, 2A and 2B, and thus are physically associated with the child restraint seat frame, 1. The securing means, 20A and 20B, are removably attached to the front loops, 2A and 2B, of the child restraint seat frame, 1, the securing means being an integral and permanent part of the child seat. The front loops, 2A and 2B, are of suitable size and project from the metal frame cross member, 11, of the child restraint seat frame, 1, in order that they can be accessed through such upholstery covering the metal seat frame. The attachment of the child seat, 20, to the child restraint seat frame, 1, instead of the vehicle platform seals the passenger compartment and prevents entry of exhaust fumes into the compartment.

The invented system accordingly comprises a child restraint seating system which utilizes the child restraint seat frame, 1, for attachment to a seat base frame, 23, whereby the tubular metal child restraint seat frame, 1, is rigidly attached to a vehicle seat metal base frame, 23, and the tubular metal child restraint seat frame, 1, is supported by the vehicle seat metal base frame, 23. The said seat base frame, 23, may also be a pre-existing OEM seat base frame.

FIG. 1 illustrates the child restraint seat of the instant invention. The tubular child restraint seat frame, 1, is stainless steel tubing which supports the cross straps 7, 7A, 7B, 8, and 8A. The cross straps are preferably of 1 inch wide stainless steel of lengths 13¼ inches, 16 inches, 14½ inches and 12½ inches, respectively.

Figure 2A:
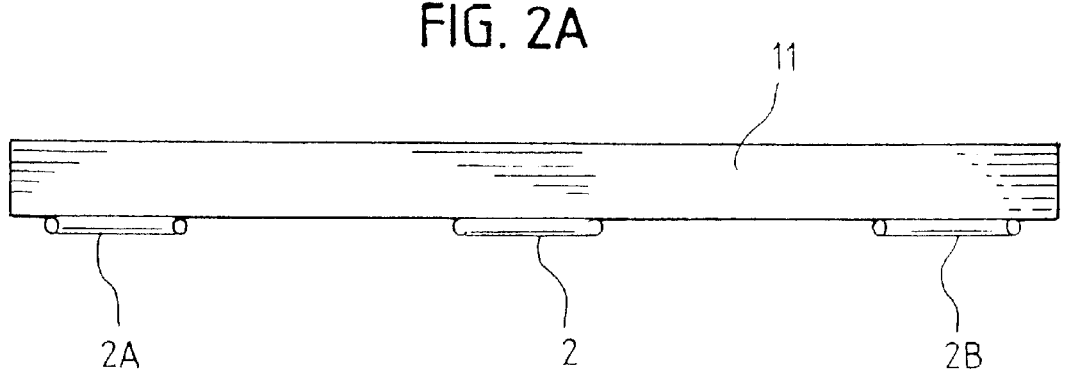
FIGS. 2A and 2B illustrates the anchorage attachment hooks and the tube frame of the child restraint seat.
Figure 2B:
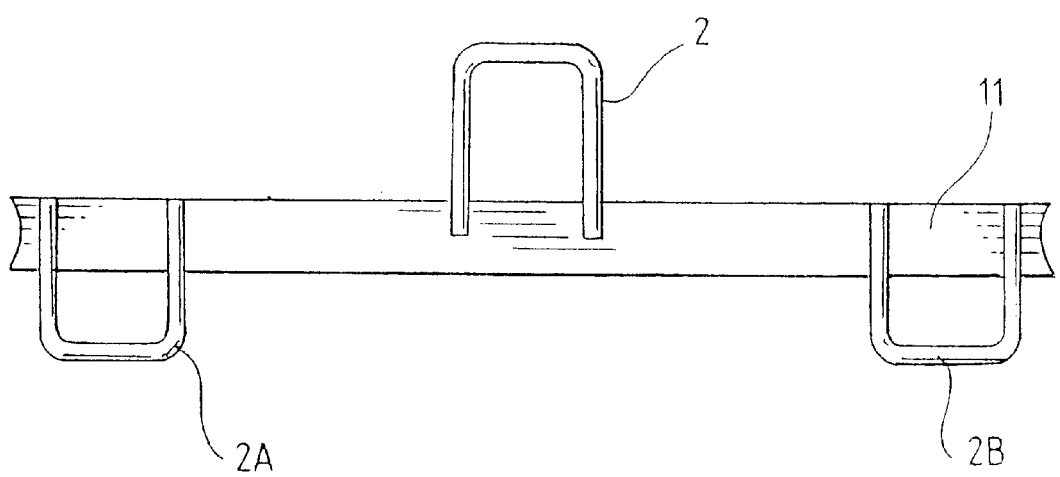

Cross member, 11, has the anchorage attachment means, 2, 2A and 2B, of the child restraint seat attached to it as detailed in FIGS. 1–2. The anchorage attachments comprise the two forward loop anchorage attachments, 2A and 2B, and the rearward loop anchorage attachment, 2, are welded to the cross tube, 11, which is preferably a stainless steel tube. The anchorage attachments, 2, 2A, and 2B, are preferably stainless steel wire, 0.23 inches (6 MM) (AISI 302), as is shown in FIG. 3, and preferably of dimensions 2 inches by 2¼ inches. FIG. 4 shows further details of the child restraint seat assembly wherein foam seating material of the child restraint seat, 6, is shown in place over the support straps 7, 7A, 7B, 8 and 8A. Flexible support strips, 21, support the foam seat material of the child restraint seat, 6, and is also shown in FIG. 4. The flexible support strips, 21, are associated with the seat tubing frame by springs, 3, of suitable tension and, thus, suitable tension is thereby created for support. The backward support of the U-shaped tubing frame of the child restraint seat frame, 1, is maintained as shown in FIGS. 1 and 4 preferably by gusset 12 of 7 gauge stainless steel, ASIMA569, welded in place to maintain the backward leaning of the child restraint seat frame, 1.

FIG. 5 and FIGS. 10–11 show the method of attachment of the child restraint seat to the seat base frame, 23. Seat mounting brackets, 7 and 8 in FIG. 11, are welded in four locations to the seat tubing frame, 1, said locations suitable to permit attachment of the child restraint seat frame, 1, to the seat base frame, 23. Suitable adjustment of the four locations can be made to permit modifications for the four locations to match the locations of the cross members of the child restraint seat frame, 1. The seat anchors, 9, attach the child restraint seat frame, 1, with the seat base frame, 23, as shown in FIG. 5. The method of attachment comprises four seat-mounting brackets welded to the stainless steel tube frame at suitable locations as indicated. Four stainless steel hex head cap screws, 9, are fitted through the seat mounting brackets, 7 and 8, to attach the stainless steel child restraint seat frame, 1, to the cross members of the seat base frame, 23. The method of attachment is detailed in FIG. 11 wherein said method of attachment comprises insertion of the cap screw, 9, through the said seat base cross members, 23, and cap screws, 9, being held in position by suitable sized spacers, 9B, and secured in position by hex nuts, 9A.

Figure 7:
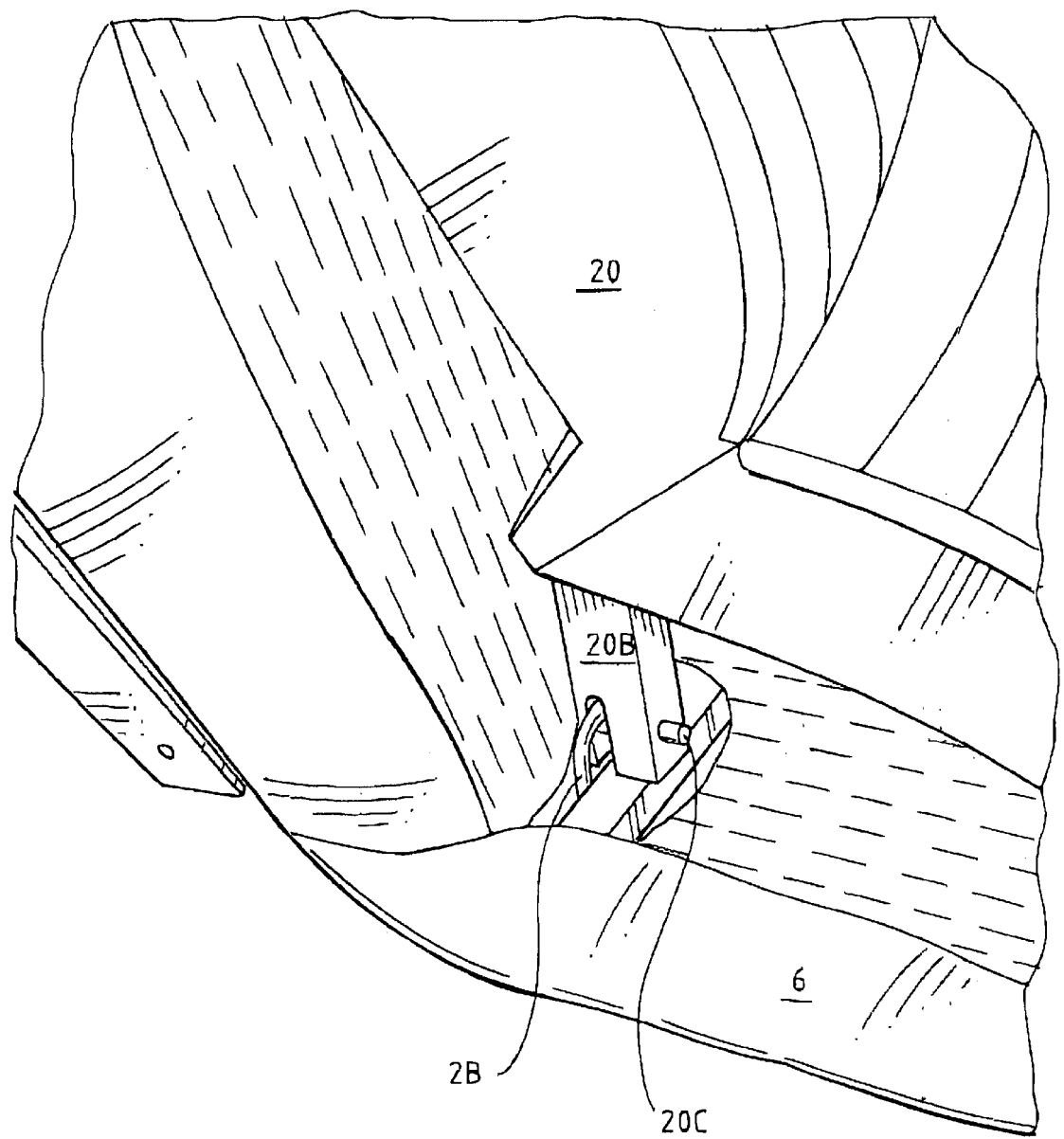
FIG. 7 is an elevational view of the two rear attachment means of the child seat to the two front projecting anchorage attachment hooks of the child restraint seat.

FIG. 6 and FIG. 7 illustrate the engagement of the front projecting loops, 2A and 2B, with the securing means, 20A and 20B, projecting from the rear of the child seat, 20. In accordance with National Highway Traffic Safety Administration Section 571,225, Standard No. 225, Child Restraint Anchorage Systems, the present invented system provides a seating system to securely attach a child restraint seat which provides two lower anchorages meeting the requirements of lower anchorages consisting of two lower bars that are a) 6 mm±1 mm in diameter, b) are straight, horizontal and transverse and whose centroidal longitudinal axes are collinear, c) are not less than 25 mm, but not more than 40 mm in length, d) can be connected to over their entire length by the connectors of a child restraint system, e) are 280 mm±mm apart measured from the center of the length of one bar to the center of the length of the other bar, f) are an integral and permanent part of the vehicle or vehicle seat and g) are rigidly attached to the vehicle such that they will not deform more than 5 mm when subjected to a 100 N force in any direction.

In addition, this invented system provides a rear tether anchorage, 2, meeting the requirements of a configuration that a) permits the attachment of a tether hook of a child restraint system meeting the configuration and geometry specified in FIG. 11 of Standard No. 213 (Section 571,213) b) be accessible to and without the need of any tools other than a screwdriver or coin, c) once accessed, be ready for and without the need for any tools d) be sealed to prevent the entry of exhaust fumes into the passenger compartment, and e) maintain the current temperature control of the vehicle.

Figure 8:
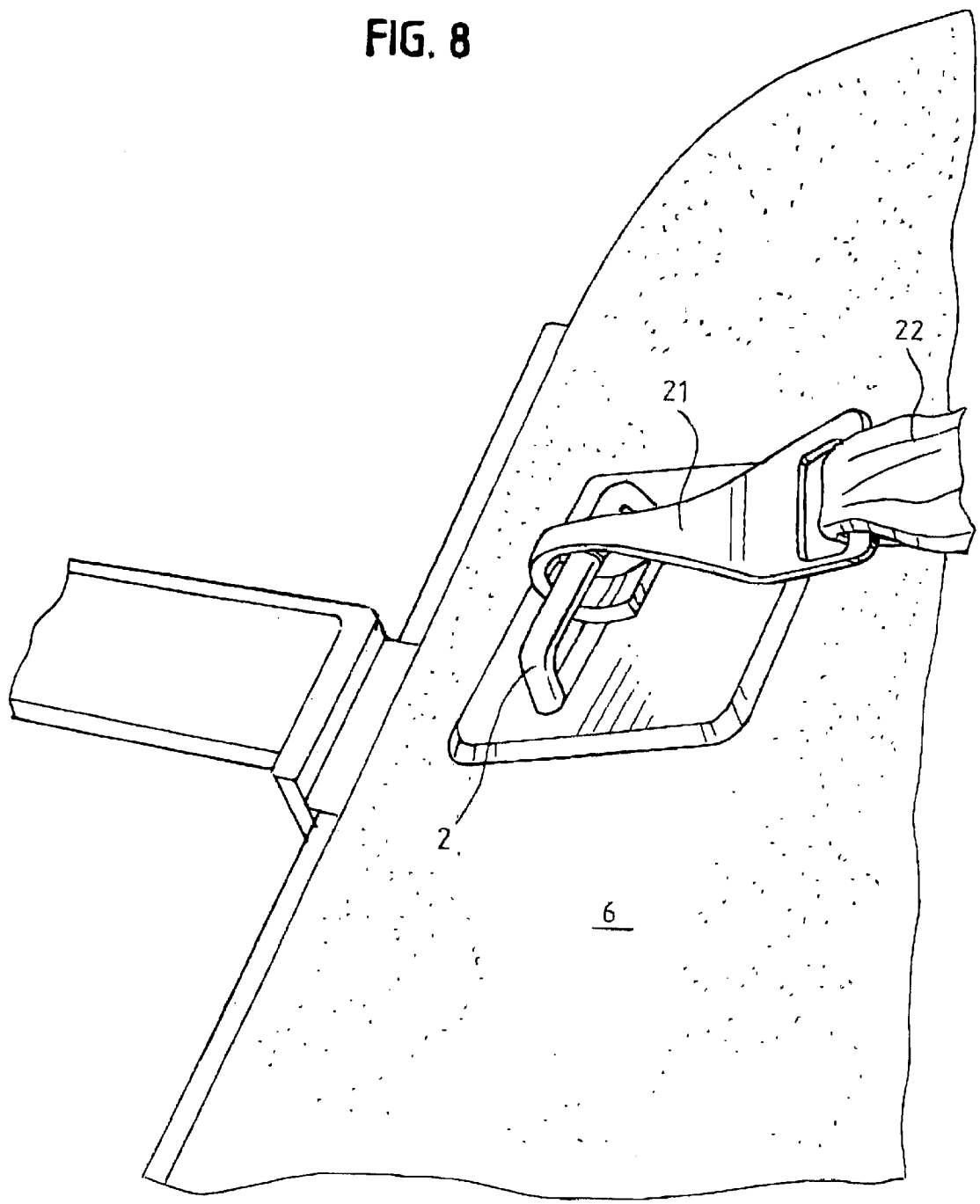
FIG. 8 is an elevational view of the tether hook attachment of the child seat to the rearwardly projecting anchorage attachment hook in the rear of the child restraint seat.

FIG. 8 illustrates a tether hook, 21, associated with a strap, 22, removably fastened to loop, 2, which projects outward from the rear of the child restraint seat, 6. The strap, 22, is fixedly associated with the child seat, 20, and the tether hook, 21, and thereby the child seat, 20, is secured to the rear of the child restraint seat, 6, and directly to the child restraint seat frame, 1, via the rear projecting anchorage, 2.

Figure 9:
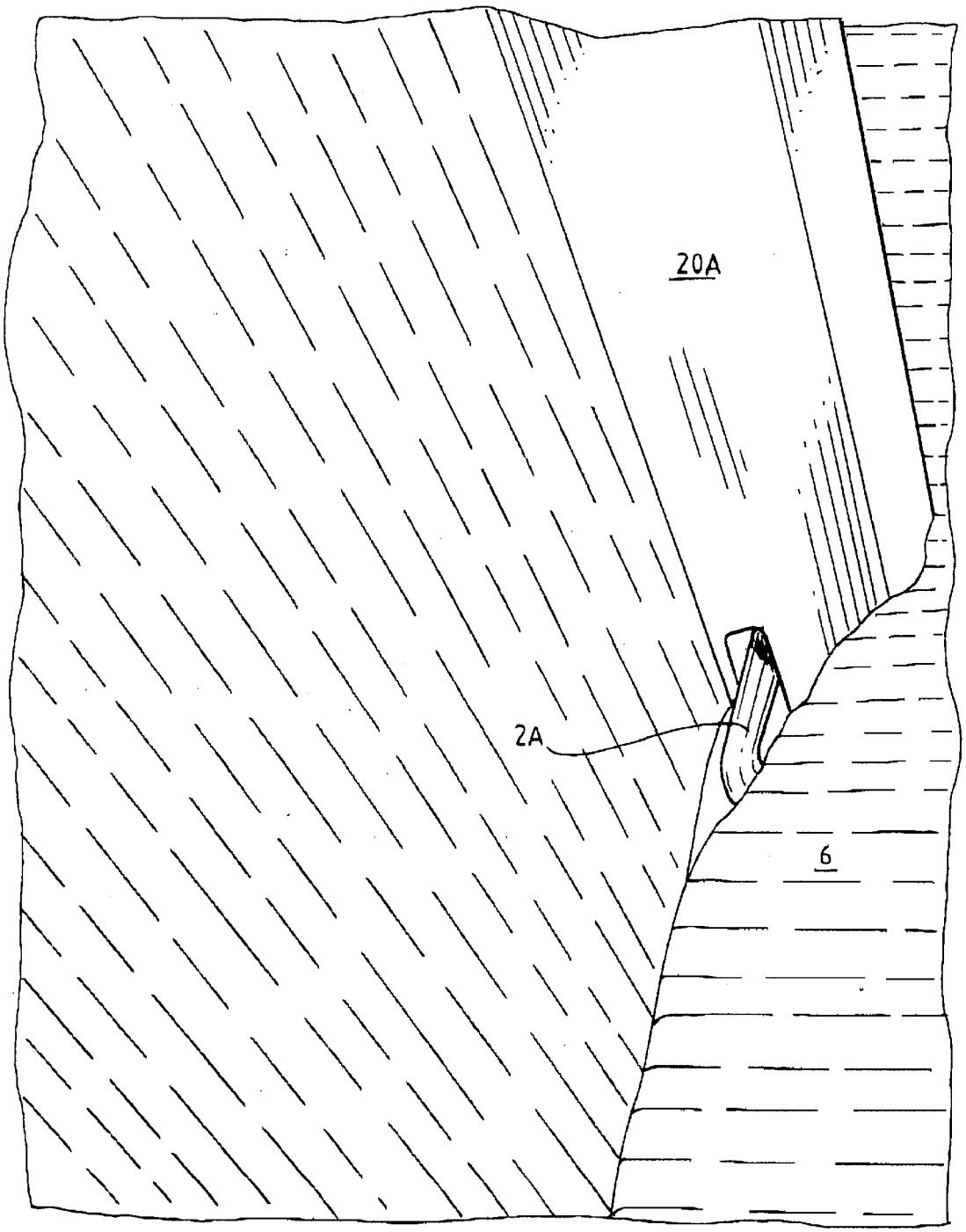
FIG. 9 is a perspective view showing the rearwardly attachment means of the child seat secured to the front projecting anchorage attachment hook of the child restraint seat through the foam seating of the child restraint seat.

FIG. 9 illustrates the front projecting loops, 2A, and the securing means, 20A, attached thereto. The manner by which the front projecting loops, 2A and 2B, are concealed by the foam seating material of the child restraint seat, 6, is evident in FIG. 9. This concealment of the said loops is an effective method to hide the loops from view and feel when the child seat, 20, is not engaged with the child restraint seat, 6. However, the front projecting loops, 2A and 2B, are easily accessible by pressing against the foam seating material of the child restraint seat, 6, and engaging the securing means, 20A and 20B, of the child seat, 20, with the front projecting loops, 2A and 2B, of the child restraint seat and thereby allowing an easy securing means of the child seat, 20, to the child restraint seat, 6.

FIG. 10 is a bottom view of the child restraint seat, 6. Flexible support strips, 21, support the foam seat material of the child restraint seat, 6, where the flexible support strips, 21, are attached to the child restraint seat frame, 1, by springs, 3, of suitable tension. When the child restraint seat system is installed in a vehicle with preexisting seating, the existing seat is removed and this invention child restraint seat is attached to the remaining seat frame as illustrated in FIG. 11, and defined above. Where the frame member exists in original equipment, it is only necessary to assemble the frame with the bracket members and child restraining seat which will also look just like FIG. 10, where the studs are shown with washers and fasteners tightly holding the child restraint seat to the seat frame.

FIG. 12 shows the child seat, 20, prior to its being installed by securing members, 20A and 20B, with the locking pins, 20C and 20D as shown in FIGS. 6 and 7, to the child restraint seat, 6, as well as tether hook, 21 to loop, 2 as shown in FIG. 8, in the rear of the seat.

From the foregoing detailed description of the invention, it has been shown how the objects of the present invention have been obtained in a preferred manner. However, modifications and equivalents of the disclosed concepts such as readily occur to those skilled in the art are intended to be included within the scope of the invention.

What is claimed is:

1. A child restraint system comprising: child restraint frame member, a supporting base frame that is fixedly associated with said child restraint frame member to provide anchorage and required support of said child restraint frame member, a tubular cross member that is fixedly attached to and part of said child restraint frame member an anchoring attachment means including two forward extending anchoring means and one rearward extending anchoring means that can be operably associated with a child restraint seat that is secured and located by being removably associated with said pair of forward extending anchoring means and said rearward extending anchoring means and held in a static position by exerting equal and opposite forces on said forward extending anchoring means and said rearward extending anchoring means.

2. A child seat restraint system as defined in claim 1, wherein said child restraint frame member is anchored and attached to a preexisting base frame means that was formerly supporting a vehicle seat of a vehicle where said seat has been removed.

3. A child seat restraint system as defined in claim 1, wherein said child restraint seat has anchorage means that extend from the rear thereof and are rearwardly associated with said two forwardly extending anchoring means and kept in static balance by an equal and opposite force being asserted on said rearward extending anchoring means.

4. A child restraint system as defined in claim 3, wherein said child restraint seat has a tether hook extending there from that is removably associated with the rearward extending anchoring means extending from said tubular cross bar.

5. A child seat restraint system as defined in claim 3, wherein said tubular cross member is fixedly attached at each end thereof to said child restraint frame member, and said child restraint frame member being in the form of a "U" shaped tube.

6. A child seat restraint system as defined in claim 5 wherein said tubular member has its forwardly extending anchorage members in the form of a wire loop that projects from a seating component of the child restraint system.

7. A child seat restraint system as defined in claim 3 wherein said tubular cross member is located proximate to the bottom of said child restraint frame member.

8. A child seat restraint system as defined in claim 3, wherein said supporting base frame has at least one pair of cross bars whereby said supporting base frame can be attached to a vehicle seat resting thereon by means of fasteners extending from said vehicle seat to said cross bars.

9. A child seat restraint system as defined in claim 8 wherein said base frame includes front brackets and a rear bracket for securing said fasteners extending from said vehicle seat.

10. A child seat restraint system as defined in claim 3, wherein said rearward extending anchoring means is removably associated with a tether hook that is attached to a belt extending from the child restraint seat.

11. A child seat restraint system as defined in claim 3, wherein a means of attaching said child restraint frame member to said supporting base frame comprising, in combination, a plurality of seat mounting brackets welded to said child restraint frame member and a plurality of cap screws or bolts of sufficient length to project through said supporting base frame and held in position by suitably sized spacers and spacer washers and hex nuts tightened into position at required torque.

12. A child seat restraint system as defined in claim 3 wherein said child restraint system provides accessible tether anchorages for tether hooks ready for use without need from any tools.

13. A child seat restraint system as defined in claim 3, wherein a means of attaching said child restraint seat to a vehicle permits sealing of the passenger compartment to prevent entrance of exhaust fumes into the passenger compartment.

\* \* \* \* \*